United States Patent [19]

Nozaki et al.

[11] Patent Number: 4,825,131
[45] Date of Patent: Apr. 25, 1989

[54] CONTROL SYSTEM FOR INDUCTION MOTOR DRIVEN ELECTRIC CAR

[75] Inventors: Yoshio Nozaki; Shigetoshi Okamatsu, both of Katsuta; Tadashi Takaoka, Ibaraki, all of Japan

[73] Assignee: Hitachi, Ltd., Tokyo, Japan

[21] Appl. No.: 115,038

[22] Filed: Oct. 30, 1987

[30] Foreign Application Priority Data

Nov. 5, 1986 [JP] Japan .................... 61-261869

[51] Int. Cl.$^4$ ............................. B61C 15/08
[52] U.S. Cl. ....................... 318/52; 318/71; 318/78; 361/238; 180/197
[58] Field of Search ................ 318/78, 71, 52; 180/197; 361/238

[56] References Cited

U.S. PATENT DOCUMENTS

| | | | |
|---|---|---|---|
| 3,983,463 | 9/1976 | Nabae et al. | 318/803 |
| 4,292,531 | 9/1981 | Williamson | 318/798 |
| 4,335,337 | 6/1982 | Okamatsu et al. | 318/52 |
| 4,686,434 | 8/1987 | Kojima et al. | 318/71 |

OTHER PUBLICATIONS

Katta, et al, "Induction Motor Propulsion System for Transit Cars", Hitachi Review, vol. 29, 1980, No. 1, pp. 19-24.

*Primary Examiner*—David Smith, Jr.
*Attorney, Agent, or Firm*—Antonelli, Terry & Wands

[57] ABSTRACT

A DC voltage on an electric car stringing is supplied to a variable voltage and variable frequency PWM inverter so as to be converted into a three-phase alternating current which is supplied to a plurality of three-phase induction motors. The motors are connected to different wheels to drive an electric car. The inverter is controlled on the basis of an operating frequency command determined by adding or subtracting a slip frequency command to or from a motor speed and a voltage command proportional to the operating frequency command. On the other hand, a motor current command is set and compared with a maximum current value of currents of the plurality of motors, and the slip frequency command is corrected in accordance with a difference therebetween. In a constant torque region of the electric car, a correction value increasing in proportion to the speed is then added to the motor current command, so that torque of motors other than a motor to which the maximum current flows compensates for a decrease in torque caused as the speed increases to improve constant torque characteristics.

18 Claims, 4 Drawing Sheets

CONTROL SYSTEM FOR INDUCTION MOTOR DRIVEN ELECTRIC CAR

BACKGROUND OF THE INVENTION

1. FIELD OF THE INVENTION

This invention relates to improvements in a control system for induction motor driven electric car.

2. DESCRIPTION OF THE PRIOR ART

An induction motor driven electric car is equipped with an inverter receiving direct current and converting it into three-phase alternating current of variable voltage and variable frequency, and a plurality of three-phase induction motors fed from the inverter to drive the electric car.

Typically, an output (operating) frequency $f_{INV}$ of the inverter is set by adding or subtracting a slip frequency fs to and from a frequency fr corresponding to a rotation speed of the induction motor (equivalent to electric car speed). The inverter is applied with a command proportional to the inverter frequency command $f_{INV}$ to set its output voltage V.

As regards the slip frequency fs, a fundamental command fsp in compliance with required torque is preset and this command is corrected by an output signal of a current control system. A current command applied to the current control system is made constant at least within a variable voltage and variable frequency (VVVF) region of the inverter and has two modes to be described later within a constant voltage and variable frequency (CVVF) region. In contrast to the current command, a motor current value to be fed back takes the form of a mean value of a plurality of motor currents or a maximum value of a plurality of motor currents.

Especially where re-adhering performance is considered significantly, a maximum current control system is desirably used. In this system, a maximum current is detected and therefore, even when part of driving wheels slip and the current flowing to a motor connected to the slipping shaft decreases, the partial slipping does not affect the other wheels. It follows therefore that the slipping shaft can be again brought into the adhering status without unnecessarily increasing the current to increase torque. Such a control system is disclosed in, for example, "Development of PWM Control System for Electric Locomotive", 18th Domestic Symposium Collected Papers No. 423 on Utilization of Cybernetics in Railway (November, 1981), Japan Railway Cybernetics Conference, pp. 245–249, especially, FIG. 6 and its description.

In an induction motor driven electric car equipped with the known maximum current control system, however, it happens that a desired level of torque can not be obtained.

SUMMARY OF THE INVENTION

An object of the present invention is to provide a control system for induction motor driven electric car equipped with maximum current control system which can improve torque control performance to realize desired electric car characteristics.

According to one aspect of the invention, a means is provided which increases a motor current command as a function of a signal representative of an inverter operating frequency or an electric car speed at least within a VVVF region of the inverter.

According to another aspect of the invention, a means is provided which corrects an inverter output voltage command, being a function of the inverter operating frequency, at least within the VVVF region of the inverter.

The difference in wheel diameter among wheels respectively connected to a plurality of induction motors takes place inevitably to some extent. The wheel diameter difference leads to a difference in rotation frequency among the motors and the rotation frequency difference increases as the speed of the electric car increases. On the other hand, since the synchronous speed of the plurality of induction motors fed from the common inverter is equally set up, the difference in slip frequency among the motors is increased to enhance torque unbalance as the electric car speed increases. At that time, the maximum current control system performs controlling such that the current to a motor sharing the maximum of torque is controlled to a desired value, with the result that the higher the electric car speed, the more the torque of the remaining motors is decreased to reduce the total torque.

To cope with this problems, according to the invention, the motor current is increased as a function of the inverter operating frequency or the electric car speed to thereby prevent a decrease in the total torque due to the wheel diameter difference and improve constant torque characteristics.

In another countermeasure, the inverter output voltage command, being a function of the inverter operating frequency, is corrected at a predetermined percentage to thereby improve constant torque characteristics within the VVVF region of the inverter.

DESCRIPTION OF THE PREFERRED EMBODIMENTS

Figure 1:
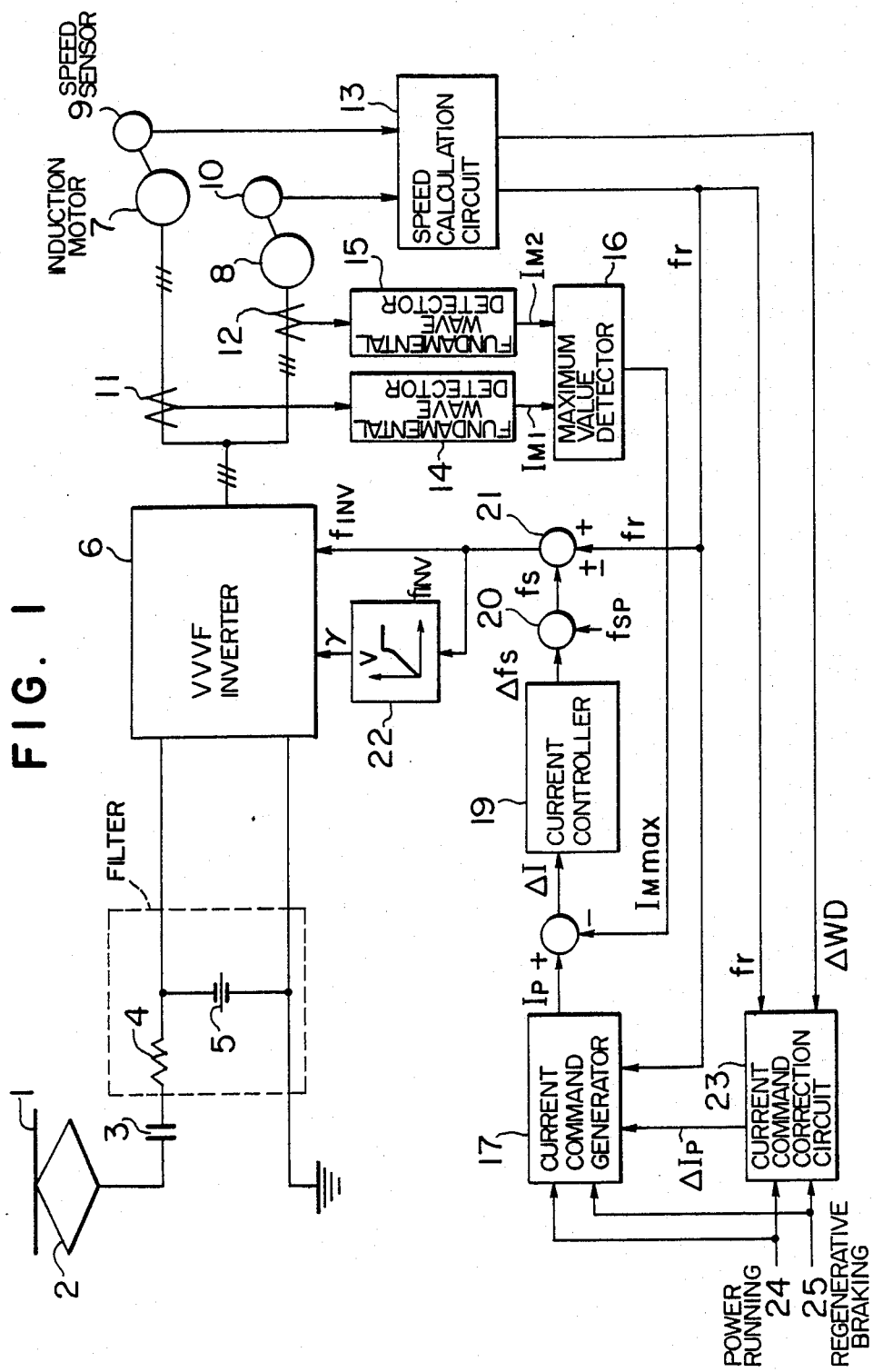
FIG. 1 is a block diagram illustrating a control system for induction motor driven electric car according to an embodiment of the invention.

Referring now to FIG. 1, a control system for induction motor driven electric car according to an embodiment of the invention will be described. There are seen in FIG. 1 a DC stringing 1, a pantograph 2, a line breaker 3, a filter reactor 4, a filter capacitor 5, a VVVF inverter 6, and three-phase induction motors 7 and 8. Speed sensors 9 and 10 are adapted to detect the rotation speeds of the induction motors and current transformers 11 and 12 to detect the primary currents of the induction motors. Also seen from FIG. 1 are a speed calculation circuit 13, fundamental wave detectors 14 and 15, and a maximum value detector 16 having preference to higher order. A current command generator 17 is adapted to command a primary current of the induction motors and a comparator 18 is operative to compare a current command Ip with a maximum motor current value $I_{Mmax}$ to calculate a difference $\Delta I$. A current controller 19 is connected to receive the difference $\Delta I$. A correction circuit 20 corrects a preset slip frequency value fsp with an output signal $\Delta fs$ of the current control system to produce a slip frequency fs. An addition/subtraction circuit 21 adds or subtracts the slip frequency fs to or from a rotation frequency fr of the motors, and acts as an adder during power running and a subtracter during regenerative braking. A percentage modulation Y command circuit 22 receives fr±fs, i.e., an inverter frequency $f_{INV}$ and produces a motor voltage V. A current command correction circuit 23 receives the motor rotation frequency fr representative of an electric car speed, a difference in wheel diameter ΔWD among a plurality of driving wheels, a power running command 24 and a regenerative braking command 25 and calculates a current command correction value ΔIp.

The operation of the control system constructed as shown in FIG. 1 will now be outlined. Running commands for an electric car are issued from a master controller not shown. With a power running notch switched on, the current command generator 17 generates a current command Ip which activates the current controller 19 to deliver a slip frequency correction value Δfs. Then, the inverter 6 delivers to the motors a motor voltage V by which the ratio V/f between inverter output voltage V (motor voltage) and inverter output frequency f is made constant, thereby causing the motors to generate torque. As described previously, motor currents are fed back through the fundamental wave detectors 14 and 15 and maximum value detector 16 having preference to higher order. As the electric car accelerates, a current command or pattern Ip corresponding to a speed fr is generated to perform given torque control. The current command correction circuit 23 is the essential part of the present invention and will be described below. Since highly accurate operations are required for controlling the VVVF inverter 6, a microprocessor is used as a control center by which various operations can be executed relatively easily. Accordingly, grounding on the fact that during coasting (notch off) of the electric car, speeds of driving wheel treads (peripheral speeds of the plurality of driving wheels) are equal to each other, the difference in wheel diameter among wheels associated with individual motor shafts can easily be determined by reading and solving rotation speeds of individual shafts. Thus, in the speed calculation circuit 13, a wheel diameter difference ΔWD between the plurality of wheels is determined during coasting. The correction circuit 23 determines a correction coefficient K on the basis of the wheel diameter difference ΔWD. The correction circuit 23 then calculates ΔIp-Kfr within a region in which the rotation frequency fr is below a predetermined rotation frequency $fr_1$ or $fr \leq fr_1$ stands and $\Delta Ip = Kfr_1$ within a region in which the rotation frequency fr exceeds the predetermined rotation frequency $fr_1$ or $fr > fr_1$ stands, and sends a calculated ΔIp to the current command generator 17. By the above function, the maximum value detection scheme can be compatible with the prevention of reduction in total torque.

Figure 2:
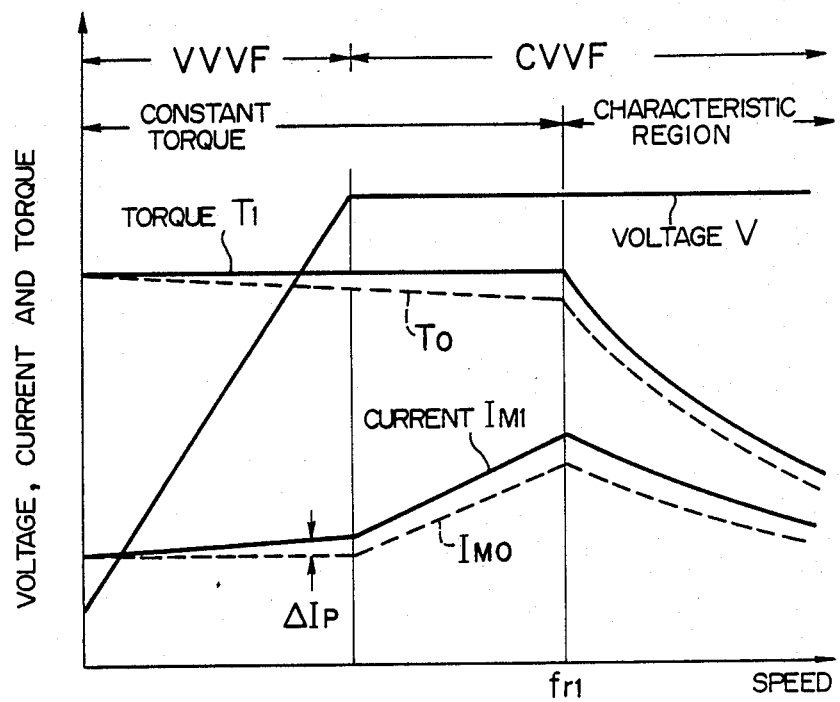
FIGS. 2 and 3 are graphs for explaining characteristics of an electric car controlled by the control system shown in FIG. 1.
Figure 3:
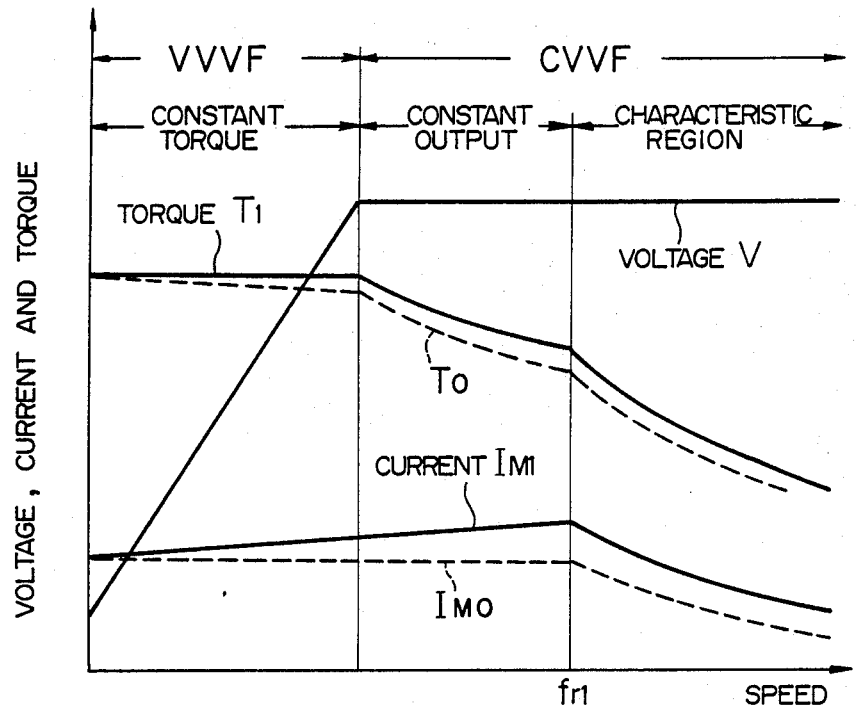

FIGS. 2 and 3 graphically illustrate voltage, current and torque characteristics when the wheel diameter difference exists. FIG. 2 indicates that when constant torque control continues until a speed $fr_1$ within a CVVF region is reached, the current $I_M$ is so controlled as to be increased in proportion to the speed fr after leaving a VVVF region.

If the maximum value of the motor current $I_M$ is so controlled as to trace a dotted curve $I_{MO}$ in the presence of the wheel diameter difference among the plurality of driving wheels, the total torque will decrease as indicated at a dotted curve $T_0$ as the speed fr increases.

More specifically, where the rotation speed of a motor, for example, motor 8 connected to a wheel of a smaller wheel diameter is fr (8) and the rotation speed of a motor, for example, motor 7 connected to a wheel of a maximum wheel diameter is fr (7), the difference fr (8) − fr (7) increases as the speed increases. Consequently, in contrast to a slip frequency fs (7) − $f_{INV}$− fr (7) of the motor 7 which remains substantially constant, a slip frequency fs (8) = $f_{INV}$− fr (8) of the motor 8 decreases as the speed increases. This accounts for the fact that the torque of respective motors other than the motor, for example, motor 7 connected to the wheel of the maximum wheel diameter and supplied with the maximum current decreases.

Then, when the maximum motor current is so controlled as to trace a solid curve $I_{M1}$ by adding the previously-described current command correction value ΔIp which is related to a correction coefficient K determined from the wheel diameter difference ΔWD, the total torque can eventually be made constant as indicated by a solid curve $T_1$.

FIG. 3 shows controlling which proceeds from a constant torque region to a constant output region and then a motor characteristic region.

In this case, correction can also be performed as in the previous case and a torque characteristic $T_1$ for electric car as shown in FIG. 3 can be obtained.

Although in the previous embodiment the current correction value ΔIp below the speed $fr_1$ is linearly changed in accordance with ΔIp=Kfr only for convenience of controlling, it is preferable that the current correction value be slightly saturated as the speed fr increases, that is, the correction coefficient K per se be slightly decreased as the speed fr increases to thereby provide a slightly convex current curve $I_{M1}$.

Figure 4:
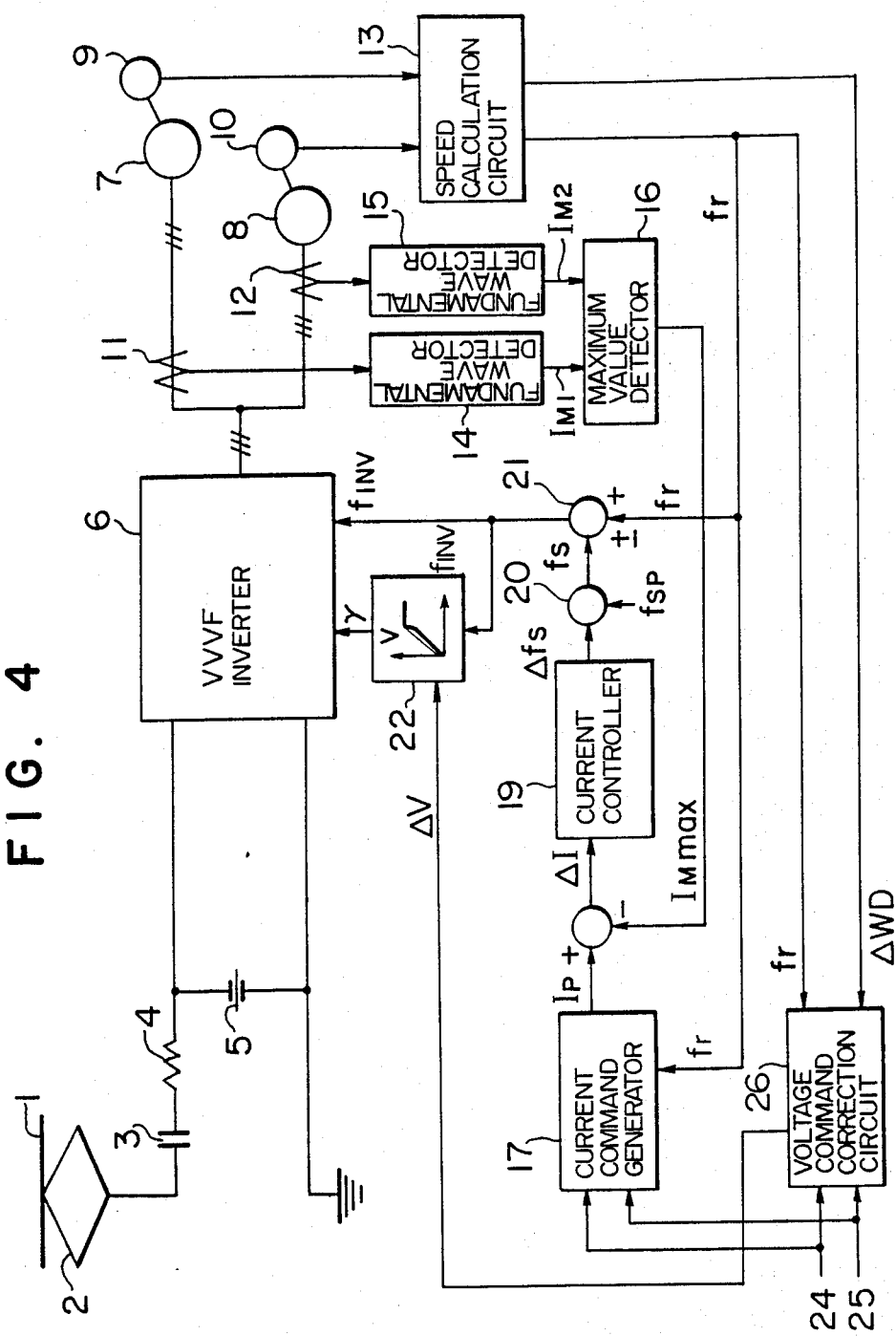
FIG. 4 is a block diagram illustrating another embodiment of control system.

FIG. 4 shows a control system for induction motor driven electric car according to another embodiment of the invention. This embodiment is identical to the FIG. 1 embodiment with the only exception that a voltage command correction circuit 26 substitutes for the current command correction circuit 23. In this embodiment, effects of correction can be obtained only when the inverter 6 runs in the VVVF region.

As described above, according to the invention, reduction in the total torque attendant on increasing speed can be corrected even in the maximum current control scheme which is of highly re-adhering capability and consequently a highly accelerative control system for induction motor driven electric car can be obtained.

We claim:
1. A control system for induction motor driven electric car comprising:
   a variable voltage and variable frequency inverter,
   a plurality of induction motors fed from said inverter and connected to different wheels;
   means for detecting currents of said motors;
   means for detecting a maximum value of the motor currents;
   means for generating a motor current command;
   a current control system for causing the maximum motor current value to follow the current command; and
   means for increasing the motor current command as a function of a signal representative of an operating frequency of said inverter or an electric car speed.
2. A control system for induction motor driven electric car according to claim 1 further comprising:

means for detecting a speed frequency representative of a rotation speed of said induction motor or an electric car speed;

means for setting a slip frequency command for said induction motor; and means for adding or subtracting the slip frequency command to or from the speed frequency to command the inverter operating frequency, wherein said current control system comprises means for correcting the slip frequency command in accordance with a difference between the current command and the maximum motor current value.

3. A control system for induction motor driven electric car comprising:

a variable voltage and variable frequency inverter;

a plurality of induction motors fed from said inverter and connected to different wheels;

means for detecting currents of said motors;

means for detecting a maximum value of the motor currents;

means for generating a motor current command;

a current control system for causing the maximum motor current value to follow the current command;

means for increasing the current command in proportion to the speed before a predetermined speed present within a speed region in which the output voltage of said inverter is made constant is reached; and means for increasing the motor current command as a function of a signal representative of an operating frequency of said inverter or an electric car speed within a speed region covering speeds which are below the predetermined speed.

4. A control system for induction motor driven electric car according to claim 3 further comprising:

means for detecting a speed frequency representative of a rotation speed of said induction motor or an electric car speed;

means for setting a slip frequency command for said induction motor; and means for adding or subtracting the slip frequency command to or from the speed frequency to command the inverter operating frequency, wherein said current control system comprises means for correcting the slip frequency command in accordance with a difference between the curent command and the maximum motor current value.

5. A control system for induction motor driven electric car comprising:

A variable voltage and variable frequency inverter;

a plurality of induction motors fed from said inverter and connected to different wheels;

means for detecting currents of said motors;

means for detecting a maximum value of the motor currents;

means for generating a motor current command;

a current control system for causing the maximum motor current value to follow the current command;

means for holding the motor currents command at a constant value within a speed region covering speeds which are below a predetermined speed present within a speed region in which the output voltage of said inverter is made constant; and means for increasing the motor current command as a function o a signal representative of an operation frequency of said inverter or an electric car speed within said speed region covering speeds which are below the predetermined speed.

6. A control system for induction motor driven electric car according to claim 5 further comprising:

means for detecting a speed frequency representative of a rotation speed of said induction motor or an electric car speed;

means for setting a slip frequency command for said induction motor; and means for adding or subtracting the slip frequency command to or from the speed frequency to command the inverter operating frequency, wherein said current control system comprises means for correcting the slip frequency command in accordance with a difference between the current command and the maximum motor current value.

7. A control system for induction motor driven electric car comprising:

a variable voltage and variable frequency inverter;

a plurality of induction motors fed from said inverter and connected to different wheels;

means for detecting currents of said motors;

means for detecting a maximum value of the motor currents;

means for generating a motor current command;

a current control system for causing the maximum motor current value to follow the current command;

means for adjusting a slip frequency in accordance with the output signal of said current control system;

means for adding or subtracting the slip frequency signal to or from an electric car speed or a signal corresponding thereto to command an inverter operating frequency;

means for generating an inverter output voltage command as a function of the inverter operating frequency command; and means for correcting the inverter output voltage command, being a function of the inverter operating frequency, within a variable voltage and variable frequency region of said inverter.

8. A control system for induction motor driven electric car according to claim 7 wherein said current control system comprises means for correcting the slip frequency command in accordance with a difference between the current command and the maximum motor current value.

9. A control system for induction motor driven electric car comprising:

a variable voltage and variable frequency inverter;

a plurality of induction motors fed from said inverter and connected to different wheels;

means for detecting currents of said motors;

means for detecting a maximum value of the motor currents;

means for generating a motor current command;

a current control system for causing the maximum motor current value to follow the current command;

means for adjusting a slip frequency in accordance with the output signal of said current control system;

means for adding or subtracting the slip frequency signal to or from an electric car speed or a signal corresponding thereto to command an inverter operating frequency;

means for generating an inverter output voltage command as a function of the inverter operating frequency command;

means for increasing the current command in proportion to the speed before a predetermined speed present within a speed region in which the output voltage of said inverter is made constant is reached; and means for correcting the inverter output voltage command, being a function of the inverter operating frequency, within a speed region covering speeds which are below the predetermined speed.

10. A control system for induction motor driven electric car according to claim 9 wherein said current control system comprises means for correcting the slip frequency command in accordance with a difference between the current command and the maximum motor current value.

11. A control system for induction motor driven electric car comprising:

a variable voltage and variable frequency inverter;

a plurality of induction motors fed from said inverter and connected to different wheels;

means for detecting currents of said motors;

means for detecting a maximum value of the motor currents;

means for generating a motor current command;

a current control system for causing the maximum motor current value to follow the current command;

means for adjusting a slip frequency in accordance with the output signal of said current control system;

means for adding or subtracting the slip frequency signal to or from an electric car speed or a signal corresponding thereto to command an inverter operating frequency;

means for generating an inverter output voltage command as a function of the inverter operating frequency command;

means for holding the current command at a constant value within a speed region covering speeds which are below a predetermined speed present within a speed region in which the output voltage of said inverter is made constant; and means for correcting the inverter output voltage command, being a function of the inverter operating frequency, within said speed region covering speeds which are below the predetermined speed.

12. A control system for induction motor driven electric car according to claim 11 wherein said current control system comprises means for correcting the slip frequency command in accordance with a difference between the current command and the maximum motor current value.

13. A control system for induction motor driven electric car according to claim 1, wherein said means for increasing the motor current command is responsive to a signal indicative of a difference in wheel diameter among a plurality of driving wheels of the electric car.

14. A control system for induction motor driven electric car according to claim 3, wherein said means for increasing the motor current command is responsive to a signal indicative of a difference in wheel diameter among a plurality of driving wheels of the electric car.

15. A control system for induction motor driven electric car according to claim 5, wherein said means for increasing the motor current command is responsive to a signal indicative of a difference in wheel diameter among a plurality of driving wheels of the electric car.

16. A control system for induction motor driven electric car according to claim 7, wherein said means for correcting the inverter output voltage command is responsive to a signal indicative of a difference in wheel diameter among a plurality of driving wheels of the electric car.

17. A control system for induction motor driven electric car according to claim 9, wherein said means for correcting the inverter output voltage command is responsive to a signal indicative of a difference in wheel diameter among a plurality of driving wheels of the electric car.

18. A control system for induction motor driven electric car according to claim 11, wherein said means for correcting the inverter output voltage command is responsive to a signal indicative of a difference in wheel diameter among a plurality of driving wheels of the electric car.

* * * * *